(12) United States Patent
Shemanarev et al.

(10) Patent No.: US 7,995,073 B1
(45) Date of Patent: Aug. 9, 2011

(54) SYSTEM AND METHOD FOR ANTI-ALIASING COMPOUND SHAPE VECTOR GRAPHICS

(75) Inventors: Maxim Shemanarev, West Chester, PA (US); Michael Antonov, Beltsville, MD (US); Brendan Iribe, Highland, MD (US)

(73) Assignee: Autodesk, Inc., San Rafael, CA (US)

( * ) Notice: Subject to any disclaimer, the term of this patent is extended or adjusted under 35 U.S.C. 154(b) by 970 days.

(21) Appl. No.: 11/826,002

(22) Filed: Jul. 11, 2007

Related U.S. Application Data

(60) Provisional application No. 60/830,103, filed on Jul. 12, 2006.

(51) Int. Cl.
 *G06T 15/30* (2006.01)
 *G06T 11/20* (2006.01)
 *G09G 5/00* (2006.01)
 *G06K 9/40* (2006.01)
 *G06K 9/32* (2006.01)

(52) U.S. Cl. ........ 345/611; 345/423; 345/606; 345/643; 345/440; 382/254; 382/266; 382/269; 382/300

(58) Field of Classification Search .................. 345/418, 345/421–423, 426, 581–582, 586, 606, 611, 345/619, 636, 643–645, 440–443, 467–468, 345/469–469.1, 501, 551; 358/1.11; 382/199–203, 382/254, 266, 269, 274, 276, 285, 293, 300
See application file for complete search history.

(56) References Cited

U.S. PATENT DOCUMENTS

| | | | | |
|---|---|---|---|---|
| 5,283,860 | A * | 2/1994 | Einkauf et al. | 345/624 |
| 5,734,386 | A * | 3/1998 | Cosman | 345/587 |
| 6,211,883 | B1 * | 4/2001 | Goel | 345/423 |
| 7,050,067 | B2 | 5/2006 | Raubacher et al. | |
| 2002/0171644 | A1 * | 11/2002 | Reshetov et al. | 345/420 |
| 2004/0207622 | A1 * | 10/2004 | Deering et al. | 345/426 |
| 2004/0257363 | A1 * | 12/2004 | Veach | 345/423 |
| 2007/0088531 | A1 * | 4/2007 | Yuan | 703/2 |

* cited by examiner

*Primary Examiner* — Sajous Wesner
(74) *Attorney, Agent, or Firm* — Patterson & Sheridan, LLP

(57) ABSTRACT

Disclosed is a system and method for edge anti-aliasing of vector graphics. The system involves a video driver, which may include commercially available hardware, such as a graphics accelerator card. The method involves identifying the edges of a tessellated image represented by compound shapes, redefining the triangles that have a side shared with one of the edges, and defining a new plurality of triangles, which are added to the redefined triangles. The new plurality of triangles correspond to the edges. By exploiting the style interpolation computational features of most graphics accelerator hardware, the triangles corresponding to the edges are interpolated between the styles on each side of the edges, thereby anti-aliasing the edges.

20 Claims, 15 Drawing Sheets

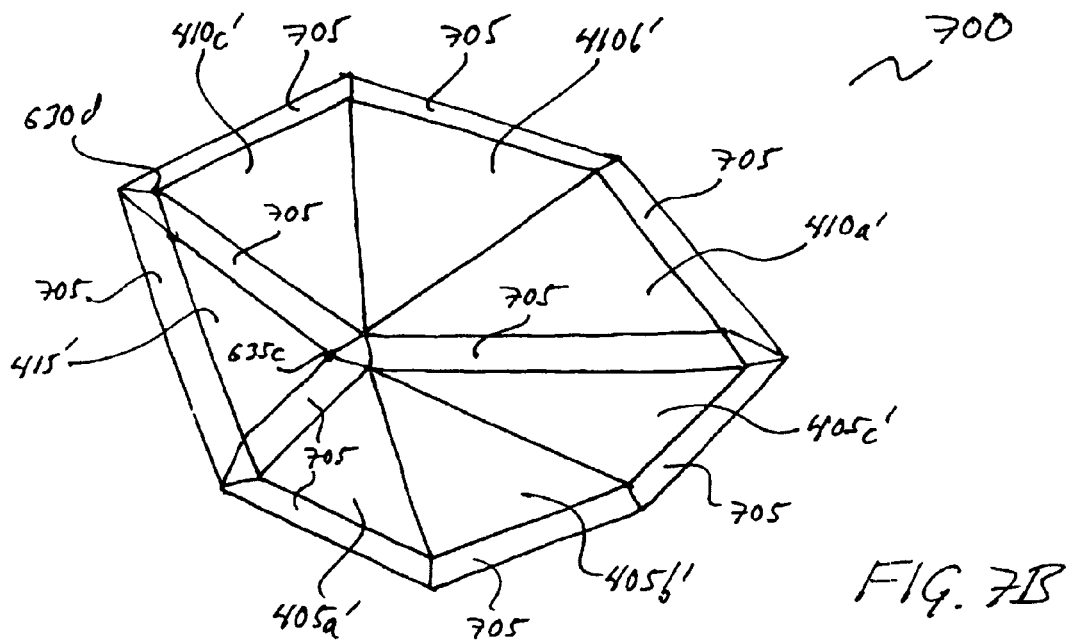
FIG. 7B
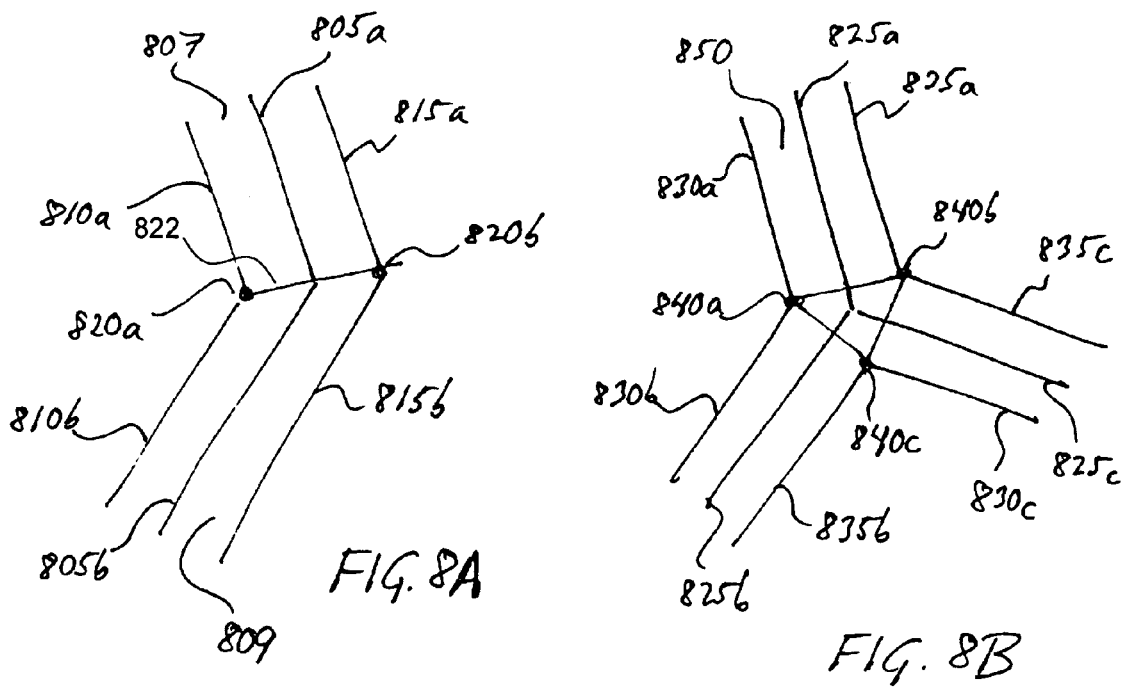
FIG. 8A
FIG. 8B

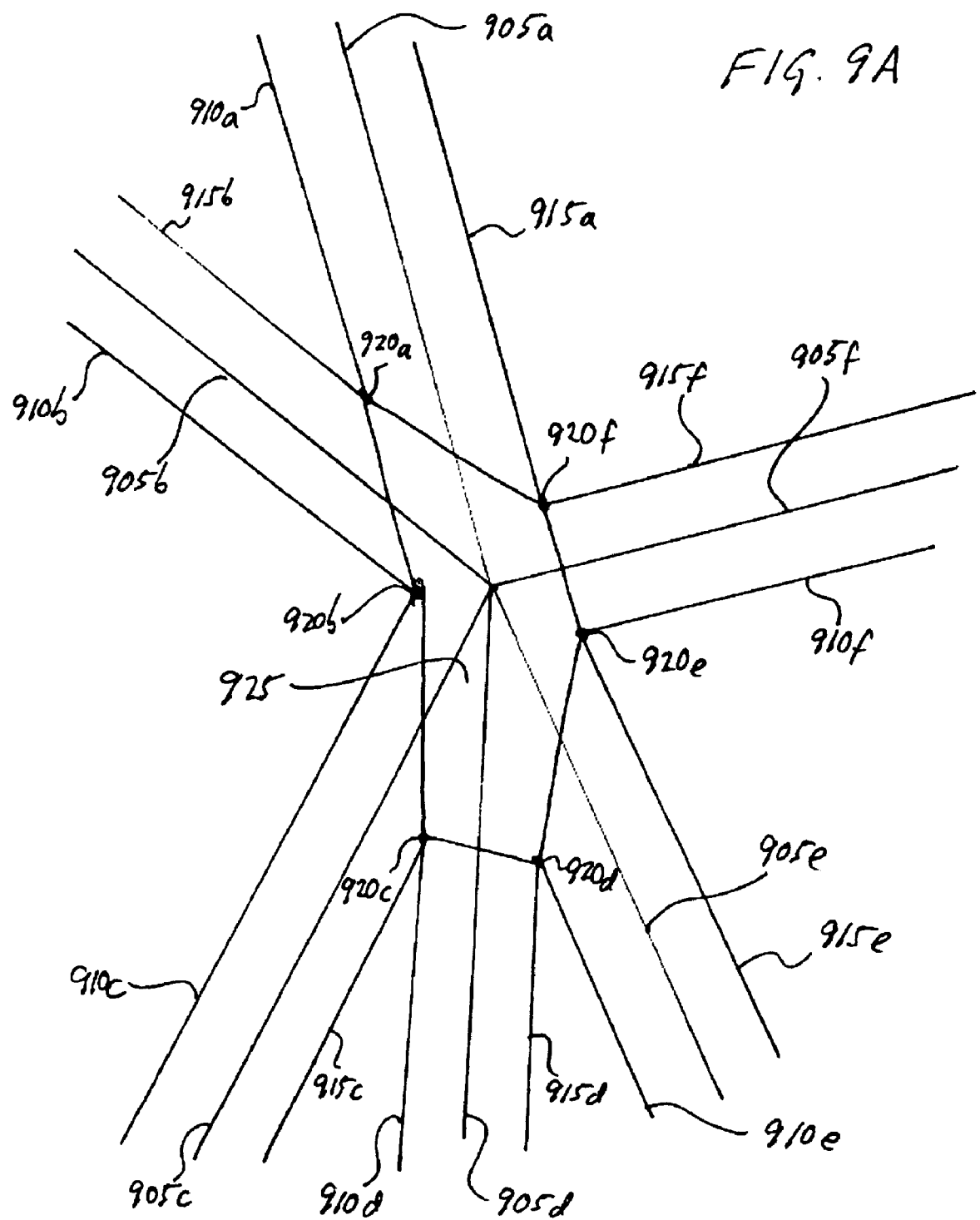

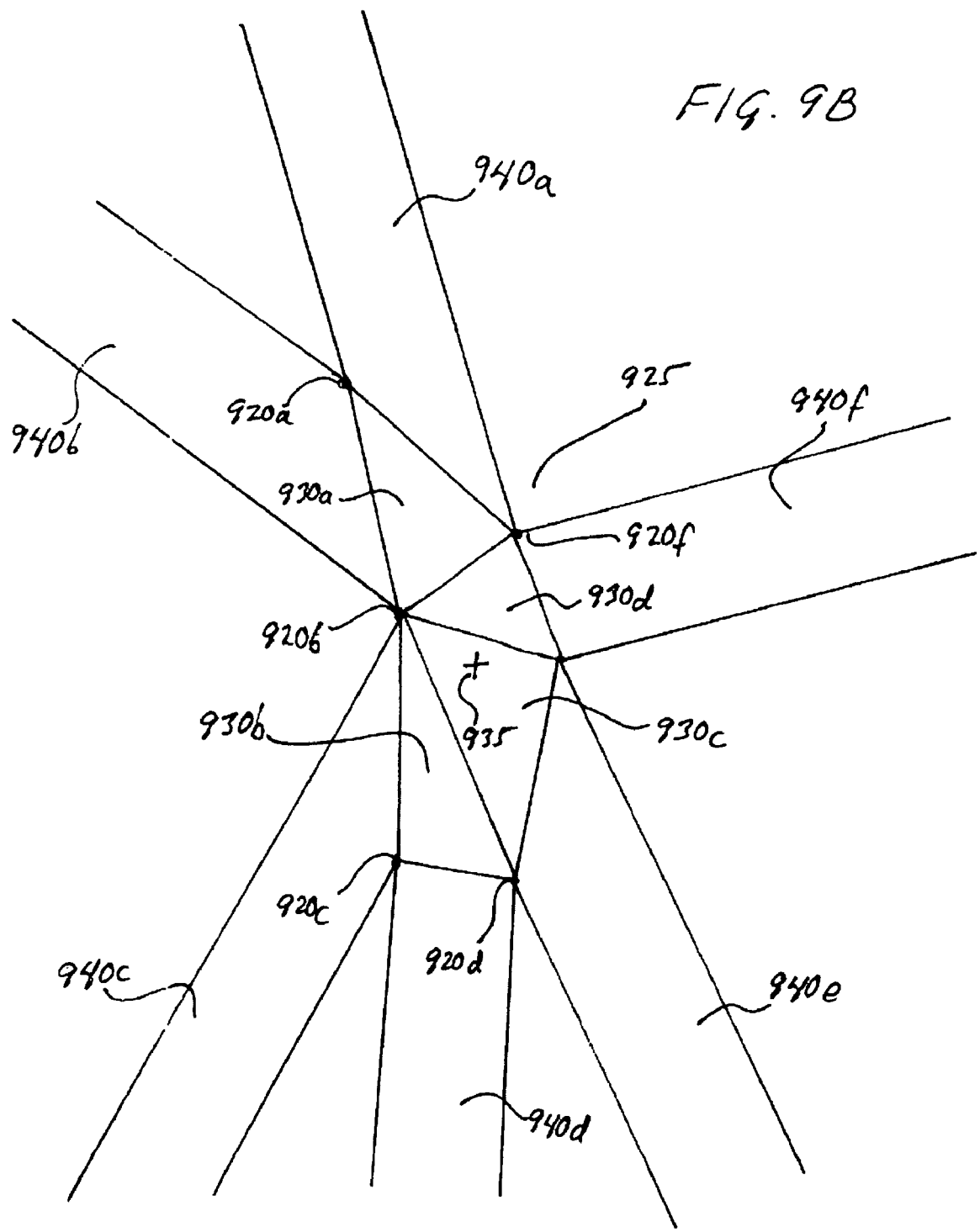

US 7,995,073 B1

SYSTEM AND METHOD FOR ANTI-ALIASING COMPOUND SHAPE VECTOR GRAPHICS

This application claims the benefit of U.S. Provisional Patent Application No. 60/830,103, filed on Jul. 12, 2006, which is hereby incorporated by reference for all purposes as if fully set forth herein.

BACKGROUND OF THE INVENTION

1. Field of the Invention

The present invention relates to electronic devices and systems that display images and animation from digital data. More particularly, the present invention generally relates to systems that display vector graphics.

2. Discussion of the Related Art

Vector graphics has revolutionized the display of images and video on computer hardware. The ability to generate more compact image data as a set of vectors using different authoring tools (in particular, to convert images from a raster scan-type data format into a set of vectors) has allowed images and video to be more efficiently transmitted over the interne. Recent refinements to vector graphics implementations have further enabled video to be transmitted to and displayed on handheld electronic devices, such as cell phones.

One such refinement to vector graphics is tessellation, or the decomposition of an image into a set of triangles. Virtually any image can be tessellated, which not only provides for efficient transmission and storage of images and video, but also provides for rapid display, depending on the display hardware.

A general problem with displaying vector graphics is that the resulting images may have "jagged" edges. Different related art anti-aliasing methods are used to address the problem of jagged edges. The most well known related art method is called "full screen anti-aliasing" (FSAA), which processes the resulting image as a whole. FSAA is computationally expensive, and is thus generally not feasible to implement on electronic devices with limited computational power, such as handheld devices. Further, the resulting quality of FSAA is limited (typically 4-8 levels of anti-aliasing). Other related art edge anti-aliasing techniques exist, which are generally more computationally efficient than FSAA. However, a well known problem of related art edge anti-aliasing techniques is that it is generally impossible to achieve "seamless stitching" between adjacent polygons when the polygons are processed and rendered separately and independently. Because related art edge anti-aliasing techniques render polygons separately, the resulting polygons typically have "seams" between them, which reduces the quality of the image.

Accordingly, what is needed is a system and method for edge anti-aliasing in vector graphics, such as tessellated vector graphics, which is computationally efficient yet mitigates the problems of jagged edges and seams between polygons.

SUMMARY OF THE INVENTION

The present invention provides a system and method for anti-aliasing for compound shape vector graphics that obviates one or more of the aforementioned problems due to the limitations of the related art.

Accordingly, one advantage of the present invention is that it improves the quality of images and video using vector graphics.

Another advantage of the present invention is that it makes better use of existing video accelerator hardware to improve the quality of vector graphics.

Yet another advantage of the present invention is that it makes better use of hardware-implemented style interpolation between triangle vertices in vector graphics.

Another advantage of the present invention is that it substantially mitigates seams and jagged edges between polygons rendered in vector graphics.

Additional advantages of the invention will be set forth in the description that follows, and in part will be apparent from the description, or may be learned by practice of the invention. The advantages of the invention will be realized and attained by the structure pointed out in the written description and claims hereof as well as the appended drawings.

To achieve these and other advantages, the present invention involves a computer-implemented method of anti-aliasing vector graphics. The computer-implemented method comprises receiving a first plurality of triangles corresponding to a tessellated image; identifying a plurality of edges corresponding to the tessellated image, wherein each of the plurality of edges define a boundary between two adjacent styles; defining a plurality of intermediate quadrilaterals, wherein the plurality of intermediate quadrilaterals correspond to the plurality of edges; defining a second plurality of triangles, wherein each of the second plurality of triangles share an edge with an intermediate quadrilateral; and tessellating the intermediate quadrilaterals.

In another aspect of the present invention, the aforementioned and other advantages are achieved by a computer-implemented method of anti-aliasing vector graphics. The computer-implemented method comprises receiving compound shape vector graphics data; constructing a connectivity graph corresponding to the compound shape vector graphics data; calculating a plurality of single style contours corresponding to the connectivity graph; calculating a plurality of equidistant lines corresponding to the plurality of single style contours; calculating an equidistant shape corresponding to the equidistant lines; subtracting the equidistant shape from the tessellated image to define a plurality of polygons; and tessellating the plurality of polygons and the equidistant shape.

In another aspect of the present invention, the aforementioned and other advantages are achieved by a system for displaying images from digital data. The system comprises a CPU; a display; and a video driver coupled to the CPU and the display, the video driver having a microprocessor and a memory, wherein the memory is encoded with instructions for receiving a first plurality of triangles corresponding to a tessellated image; identifying a plurality of edges corresponding to the tessellated image; defining a plurality of intermediate quadrilaterals, wherein the plurality of intermediate quadrilaterals correspond to the plurality of edges; defining a second plurality of triangles, wherein each of the second plurality of triangles share an edge with an intermediate quadrilateral; tessellating the intermediate quadrilaterals; rasterizing the second plurality of triangles and the tessellated intermediate quadrilaterals to create a rasterized image; and transmitting the rasterized image to the display.

In yet another aspect of the present invention, the aforementioned and other advantages are achieved by a computer readable medium encoded with instructions for a program for anti-aliasing vector graphics for a display. The program comprises receiving compound shape vector graphics data; constructing a connectivity graph corresponding to the compound shape vector graphics data; calculating a plurality of single style contours corresponding to the connectivity graph;

calculating a plurality of equidistant lines corresponding to the plurality of single style contours; calculating an equidistant shape corresponding to the equidistant lines; subtracting the equidistant shape from the tessellated image to define a plurality of polygons; and tessellating the plurality of polygons and the equidistant shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 7B illustrates the redefined triangles of FIG. 7A along with a plurality of intermediate convex quadrilaterals.

FIG. 8A illustrates an exemplary intersection of two edges and portions of their respective intermediate convex quadrilaterals.

FIG. 8B illustrates an exemplary intersection of three edges and portions of their respective intermediate convex quadrilaterals.

FIG. 9A illustrates an exemplary intersection of multiple edges and portions of their intermediate convex quadrilaterals.

FIG. 9B illustrates a plurality of intermediate triangles defined between the intermediate convex quadrilaterals of FIG. 9A.

DETAILED DESCRIPTION OF THE ILLUSTRATED EMBODIMENTS

Figure 1:
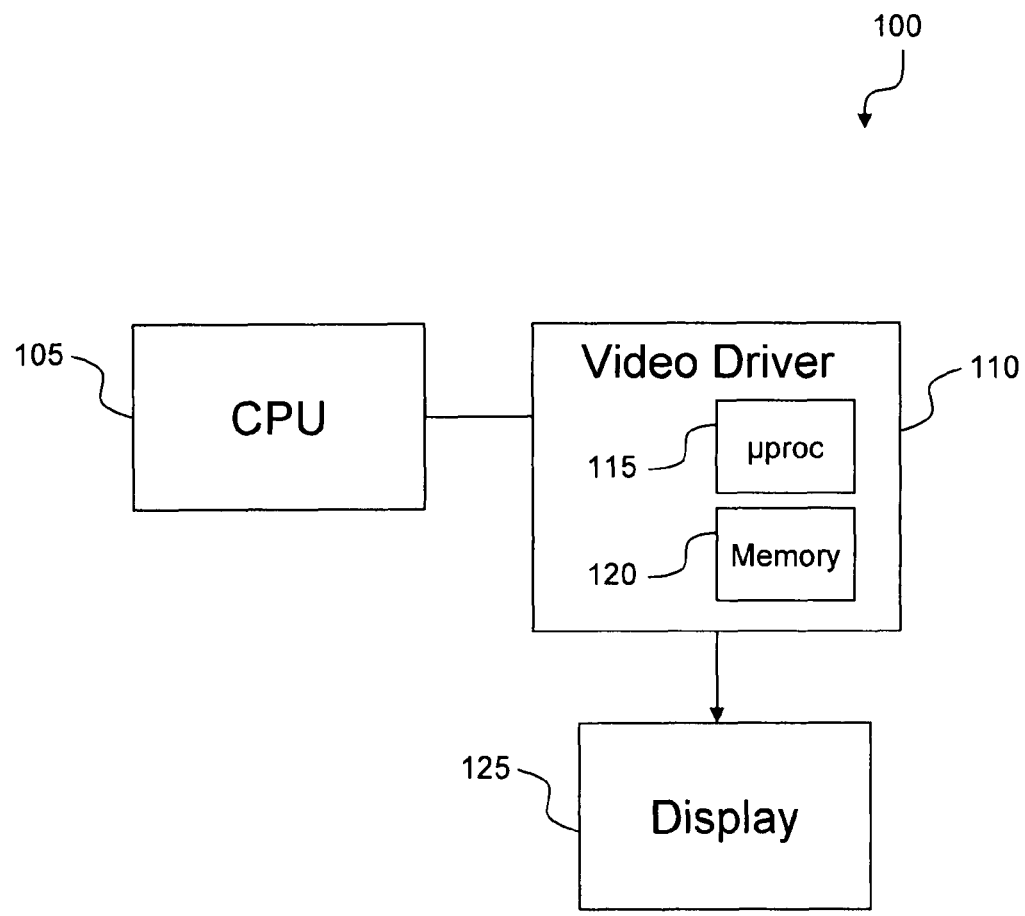
FIG. 1 illustrates an exemplary system for displaying vector graphics images and video.

FIG. 1 illustrates an exemplary system 100 for displaying vector graphics and video as well as for anti-aliasing vector graphics. System 100 includes a central processing unit (CPU) 105, a video driver 110, and a display 125. System 100 may be a commercially available desktop computer or laptop. System 100 may also be an embedded component of a special-purpose device, such as a cell phone or a set top box. System 100 may be implemented as separate components or chips, or may be integrated into one or more devices, such as a system-on-chip (SoC).

CPU 105 may include a standalone computer or laptop, or it may include processor hardware that is employed in an electronic device, such as a cell phone, personal digital assistant (PDA), and the like. CPU 105 may include one or more processors, application-specific integrated circuits (ASICs), microcontrollers, etc., or may be integrated into a SoC. Further, CPU 105 may include a plurality of processors or devices that are distributed over a network.

Video driver 110 includes a microprocessor 115 and a memory 120. Microprocessor 115 may include one or more processors, ASICs, microcontrollers, and the like, which process image data provided by CPU 105 into a format suitable for display on display 125. Microprocessor 115 may include video accelerator hardware that is commercially available.

Memory 120 is a computer readable medium encoded with machine readable instructions and data (hereinafter "the software") for implementing processes associated with the present invention. Memory 120 may be integrated with microprocessor 115; it may be installed on the video driver 110 and connected to microprocessor 115; or it may be remotely located from video driver 110, whereby the software may be downloaded from CPU 105 to video driver 110 as needed. Memory 120 may also be encoded with instructions and data for rasterizing tessellated images using techniques that are known to the art. Memory 120 may include any medium that can be used to store data, including magnetic, optical, flash, and the like.

Display 125 may be a physical image generation device such as a liquid crystal display (LCD) or similar. Alternatively, display 125 may be an internal memory buffer contained in memory 120 or CPU 105, or it may be a separate device capable of receiving, storing or processing image data.

Video driver 110 may be integrated within either CPU 105, display 125, or its functionality may be distributed between both. It will be readily apparent to one skilled in the art that many different architectures for system 100 are possible and within the scope of the invention. For example, any of the hardware described above (e.g., microcontroller, ASIC, SoC, etc.), alone or in combination, may be used to implement system 100, and that the hardware may be distributed over a network.

Figure 2:
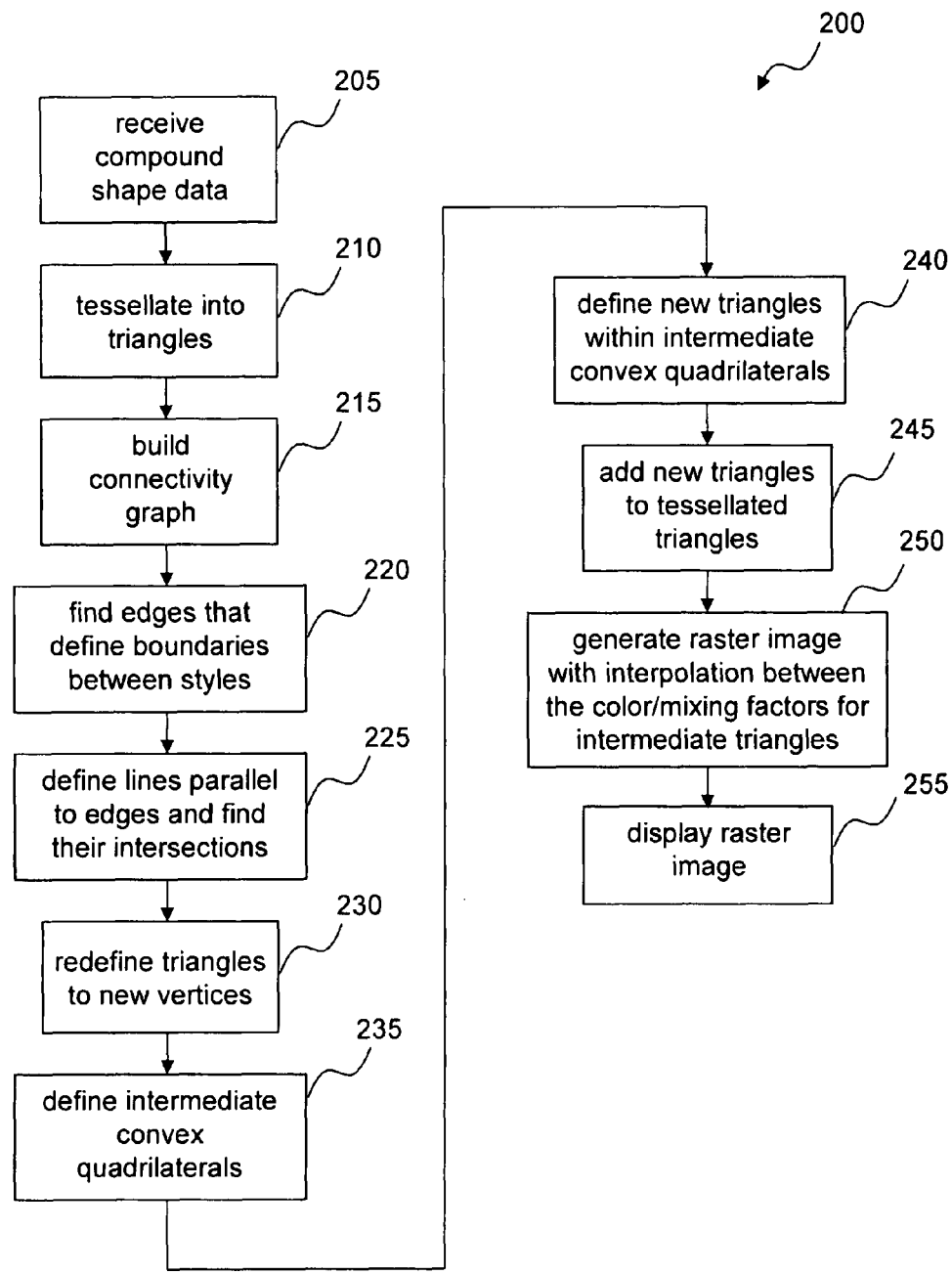
FIG. 2 illustrates an exemplary process for edge anti-aliasing vector graphics.

FIG. 2 illustrates an exemplary process 200 for edge anti-aliasing. Process 200 may be implemented, all or in part, by microprocessor 115 executing the software stored in memory 120.

At step 205, video driver 110 receives compound shape image data from CPU 105. Compound shape data may include data formatted according to a compound path vector graphics format, which is known to the art. On receiving the compound shape image data, microprocessor 115 may execute the software to store the compound shape data in memory 120.

In a variation to step 205, video driver 110 may receive vector graphics data in any known format. In this case, microprocessor 115 may execute the software to store the received vector graphics data in memory 120, convert the vector graphics data into compound shape image data, and then store the compound shape image data in memory 120. Processes for converting vector graphics data into compound shape image data are known to the art. However, one skilled in the art will readily appreciate that such a variation to step 205 is within the scope of the invention.

Figure 3:
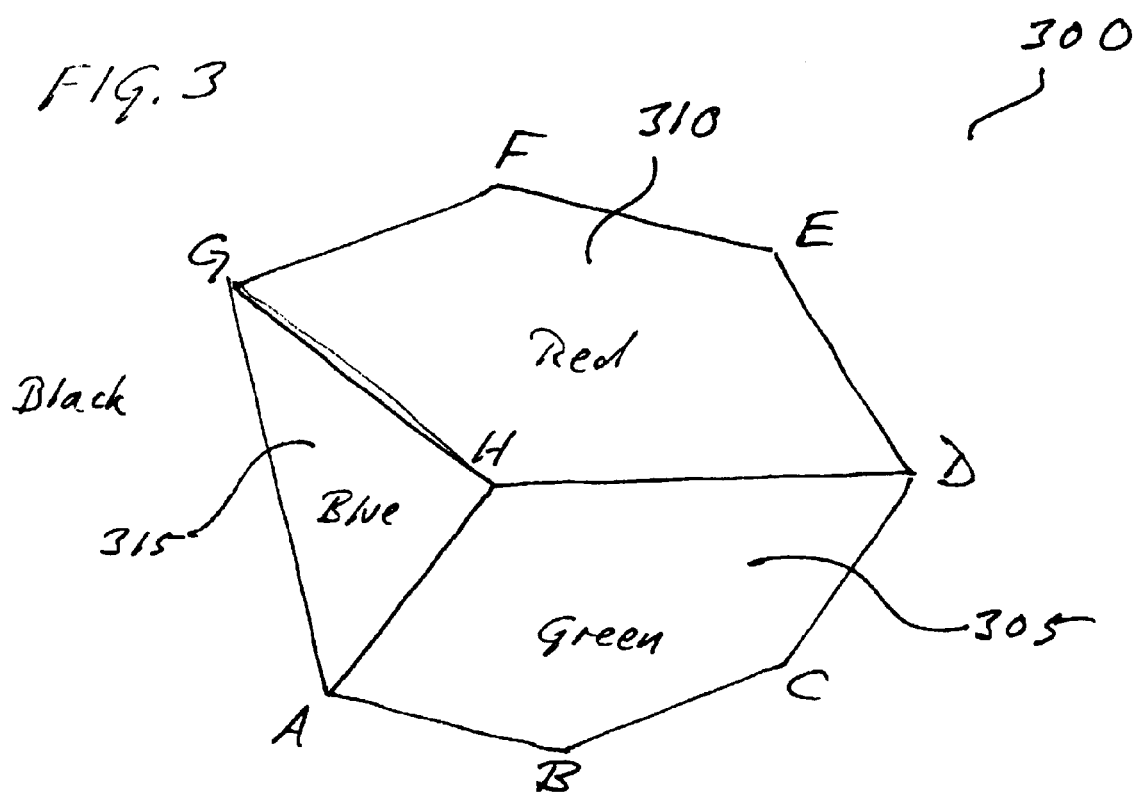
FIG. 3 illustrates an exemplary image represented by compound shapes.

FIG. 3 illustrates an exemplary image 300 represented by compound shapes. The compound shape image data corresponding to image 300 may be stored in memory 120 according to the following exemplary representation in Table 1.

TABLE 1

| path | vertices | styles (left, right) |
|---|---|---|
| 305 | A-B-C-D-H | {green, black} |
| 310 | D-E-F-G-H | {red, black} |
| 315 | A-H-G | {blue, black} |

Each vertex in Table 1 represents a coordinate in image space. The paths in Table 1 are paths corresponding to the compound shape vector graphics format. The styles listed in Table 1 are exemplary. Style may also (or alternately) include texture, fill patterns, and the like.

At step 210, microprocessor 115 executes the software to tessellate image 300 into a triangle mesh.

Figure 4:
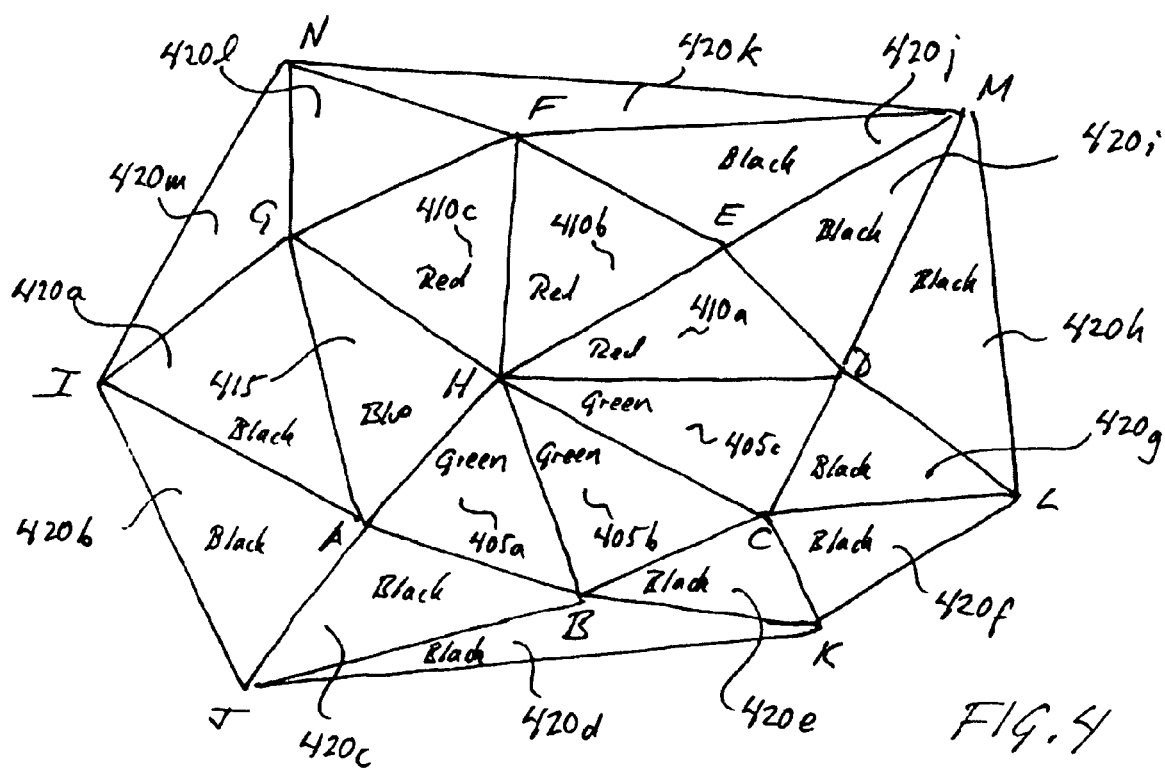
FIG. 4 illustrates the exemplary image of FIG. 3 after it has been tessellated.

FIG. 4 illustrates an exemplary triangle mesh 400, which corresponds to image 300. Triangle mesh 400 includes a plurality of unique vertices (A-H), for which no two vertices have the same coordinates.

In tessellating image 300 into triangle mesh 400, the software may include instructions to parse the compound shape image data stored in memory 120, to build a new data structure corresponding to triangle mesh 400, and to store triangle mesh 400 data in memory 120 according to the following exemplary representation in Table 2.

TABLE 2

| triangle | vertices | style |
|---|---|---|
| 405a | A-B-H | green |
| 405b | B-C-H | green |
| 405c | C-D-H | green |
| 410a | H-D-E | red |
| 410b | H-E-F | red |
| 410c | H-F-G | red |
| 415 | A-H-G | blue |
| 420a | A-G-I | black |
| 420b | J-A-I | black |
| 420c | J-B-A | black |
| 420d | J-K-B | black |
| ... | ... | ... |

As illustrated in FIG. 4 and Table 2, all of the triangles are defined in the same direction. In this example, all of the triangles are defined counter-clockwise, although clockwise may be used, if used consistently.

At step 215, microprocessor 115 executes the software to build a connectivity graph. In doing so, microprocessor 115 may execute instructions to find edges between the triangles, wherein the edges define a boundary between styles. In other words, the edges determined at step 215 are shared between two different styles.

Figure 5:
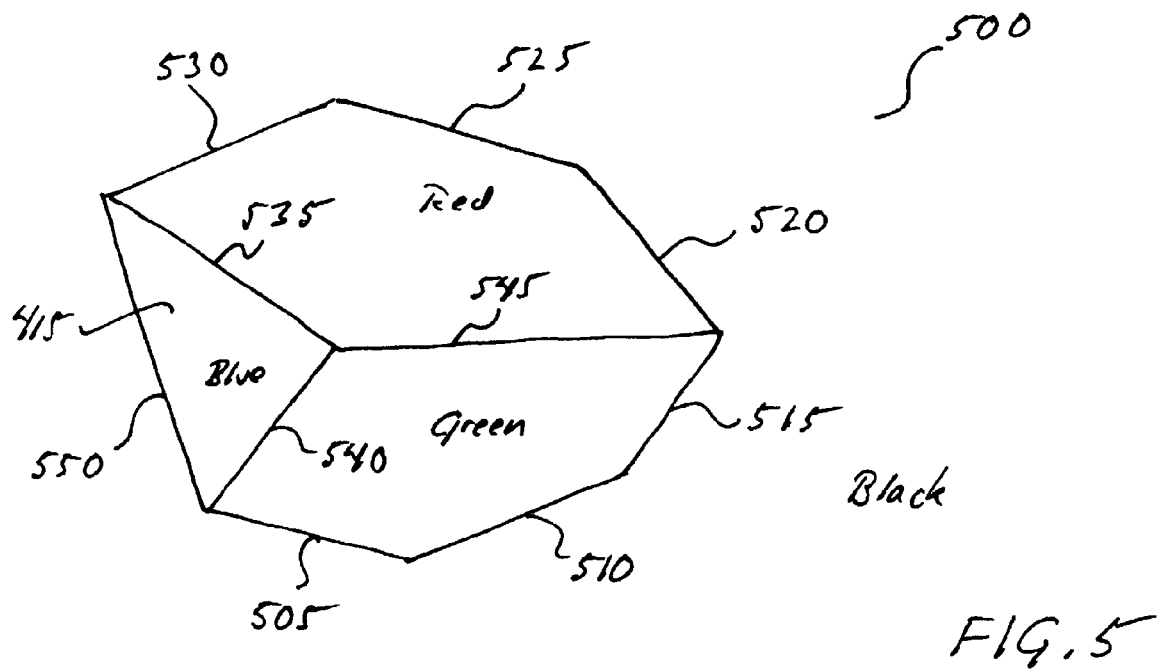
FIG. 5 illustrates an exemplary connectivity graph.

FIG. 5 illustrates an exemplary visual depiction of a connectivity graph 500, which includes a plurality of edges 505-550 between styles. Note that for exemplary triangle mesh 400, many of the black triangles (420c, 420e, 420g, 420i, and 420l) do not have an edge. Depending on the image, many triangles of the corresponding triangle mesh may not have edges. Note that the exemplary visual depiction of connectivity graph 500 is substantially similar to exemplary image 300, which is represented by compound shapes. A difference between the two is that connectivity graph 500 is the result of microprocessor 115 processing triangles at step 215, whereas exemplary image 300 corresponds to paths. Step 215 may be performed on substantially any triangle mesh under the following data integrity requirements: first, all vertices in the triangle mesh must be unique; and second, all triangles must have the same direction—clockwise or counter-clockwise.

In building a connectivity graph, microprocessor 115 may execute the software to build the connectivity graph by searching through the triangle mesh created at step 210 and building a table in which the edges are stored in memory 120. The connectivity graph may be stored in the following exemplary representation in Table 3.

TABLE 3

| edge | triangles | styles (left, right) |
|---|---|---|
| 505 (A, B) | (405a, 420d) | {green, black} |
| 510 (B, C) | (405b, 420e) | {green, black} |
| 515 (C, D) | (405c, 420g) | {green, black} |
| 520 (D, E) | (410a, 420i) | {red, black} |
| ... | ... | ... |
| 545 (H, D) | (410a, 405c) | {red, green} |
| 550 (A, G) | (415, 420a) | {black, blue} |

At step 225, microprocessor 115 executes the software to define a plurality of parallel lines, such that each edge in the connectivity graph has two corresponding parallel lines, with one on each side of the edge.

Figure 6:
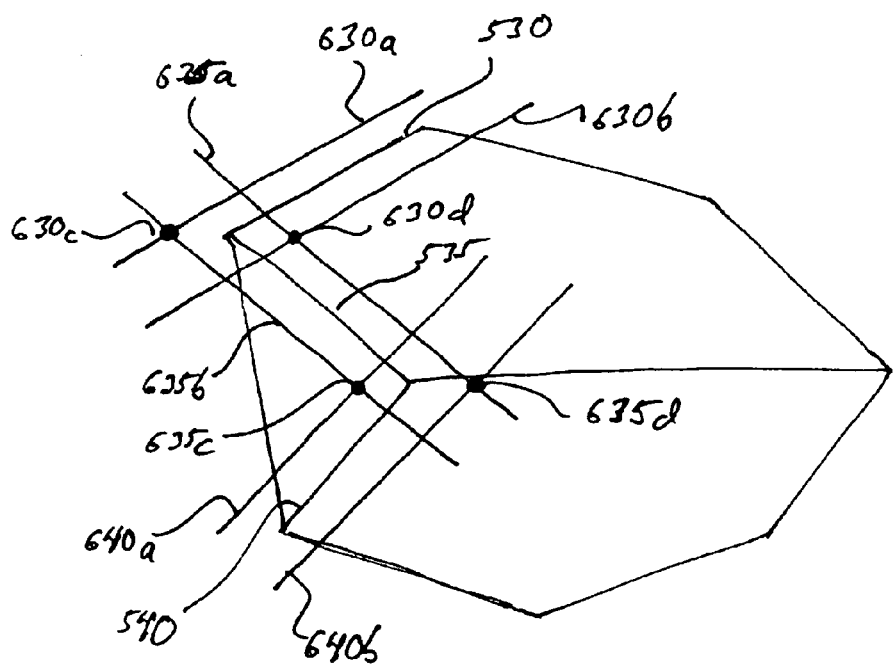
FIG. 6 illustrates a plurality of exemplary parallel lines and intersection points for two edges of the exemplary connectivity graph of FIG. 5.

FIG. 6 illustrates several of the plurality of parallel lines defined at step 225. For example, as illustrated in FIG. 6, lines 630a and 630b are defined parallel to edge 530; lines 635a and 635b are defined parallel to edge 535; and lines 640a and 640b are defined parallel to edge 540.

Further to step 225, for each of these parallel lines, microprocessor 115 executes the software to identify the intersections of these parallel lines. For example, intersection point 630c corresponds to the intersection of lines 630a and 635b; 630d corresponds to the intersection of lines 630b and 635a; intersection point 635c corresponds to the intersection of lines 640a and 635b; and intersection point 635d corresponds to the intersection of lines 635a and 640b. Microprocessor 115 may do this for all of the edges of connectivity graph 500 and store the resulting intersection points in memory 120.

The distance between the parallel lines and their corresponding edge may be stored as a configuration parameter in memory 120. For example, the distance between the parallel lines may be approximately equal to the width of one pixel. In this case, linear color interpolation (described below) produces a higher quality edge anti-aliasing. The distance between the parallel lines may be varied. By varying the distance between the parallel lines, it may be possible to sharpen or blur the edges. It will be readily apparent to one skilled in the art that such variations are possible and within the scope of the invention.

At step 230, for each intersection point, microprocessor 115 executes the software to redefine the vertices of the triangles in triangle mesh 400 at a corresponding intersection point.

Figure 7A:
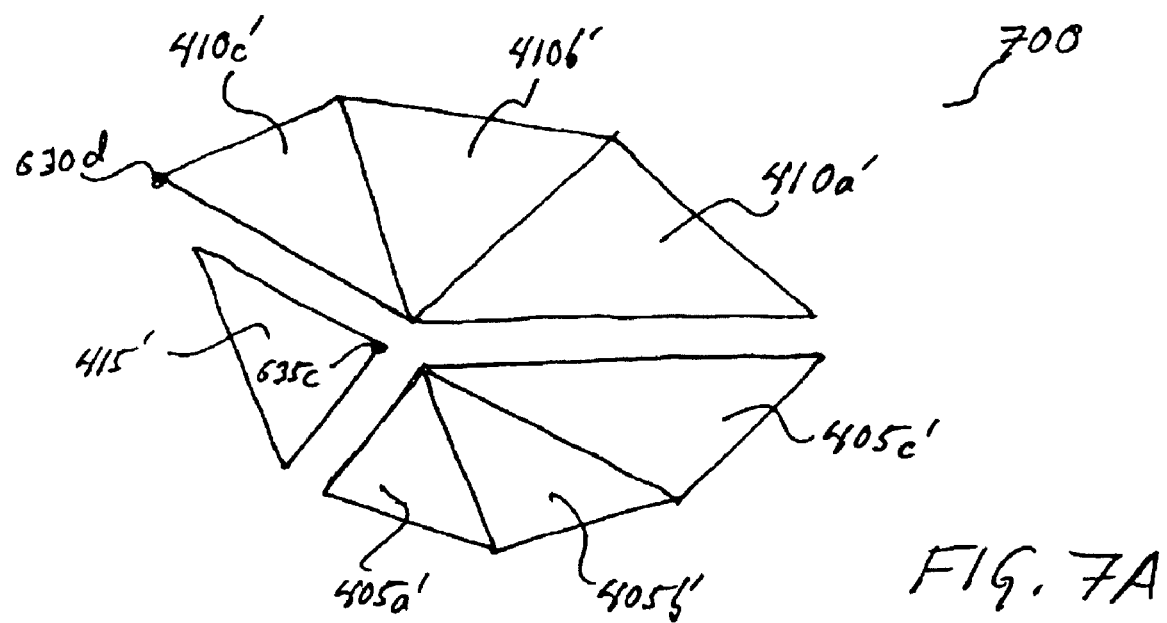
FIG. 7A illustrates a plurality of redefined triangles.

FIG. 7A illustrates plurality of exemplary redefined triangles 700 corresponding to the parallel lines and intersection points defined at step 225. For example, redefined triangle 405a' corresponds to triangle 405 of FIG. 4, redefined triangle 405b' corresponds to triangle 405, etc. For example, intersection points 630d and 635c respectively define vertices of redefined triangles 410c' and 415'. Further to step 230, microprocessor 115 may execute the software to create a new triangle table, like exemplary Table 2, but with redefined triangles, and store the redefined triangle table in memory 120.

At step 235, microprocessor 115 executes the software to define a plurality of intermediate convex quadrilaterals 705. In doing so, microprocessor 115 executes the software to define a plurality of intermediate convex quadrilaterals 705 based on the triangle vertices defined and stored at step 230.

FIG. 7B illustrates plurality of triangles 700, along with a plurality of convex quadrilaterals 705. As illustrated in FIG. 7B, intermediate convex quadrilaterals 705 may be trapezoidal in shape, depending on the locations of the corresponding triangle vertices. Further, depending on the geometry of the intersections of the parallel lines forming the triangle vertices, the intersections may result in a complex shape that does not readily decompose into quadrilaterals.

FIG. 8A illustrates a simple case of the convergence of edges 805a and 805b. The case illustrated in FIG. 8A is common, and illustrated in FIG. 7B, at the shared outer vertex between triangles 405b' and 405c'. Further illustrated in FIG. 8A are parallel lines 810a and 815a, which are parallel to edge 805a; and parallel lines 810b and 815b, which are parallel to edge 805b. Parallel lines 810a and 810b intersect at intersection point 820a; and parallel lines 815a and 815b intersect at intersection point 820b. In defining the intermediate convex quadrilaterals 807 and 807, microprocessor 115 may execute the software to define a quadrilateral boundary 822 between intersection points 820a and 820b. Parallel lines 810a, 815a, 810b, and 815b, and intersection points 820a and 820b, are determined in step 225 described above.

FIG. 8B illustrates a more complicated case, in which three edges 825a, 825b, and 825c intersect. In this case, parallel lines 830a, 830b, 830c, 835a, 835b, and 835c yield three intersection points: 840a, 840b, and 840c. Here, microprocessor 115 executes the software to define a triangle by intersection points 840a, 840b, and 840c. Accordingly, in defining intermediate convex quadrilaterals at step 235, an additional intermediate triangle is defined. Microprocessor 115 executes the software to store any intermediate triangles, along with the intermediate convex quadrilaterals, in memory 120.

FIG. 9A illustrates a general case of an intersection of a plurality of edges 905a-f. Edges 905a-f are respectively assigned parallel lines 910a-f and 915a-f, resulting in intersection points 920a-f. Note that intersection points 920a-f define a complex shape 925 that cannot be defined by a single intermediate triangle, as in the case of FIG. 8B.

FIG. 9B illustrates the exemplary intersection of FIG. 9A, with edges 905a-f removed for convenience. FIG. 9 illustrates complex shape 925. Further to step 235, in the case of edge intersections yielded a complex shape, as illustrated by exemplary shape 925, microprocessor 115 may execute the software to define a plurality of intermediate triangles 930a-d. In doing so, microprocessor 115 may execute the software to define a center 935 of complex shape 925. The software may further include instructions to identify the intersection point furthest from center 935, which in this example is intersection point 920a; define an intermediate triangle 930a, which isolates the furthest intersection point 920a from center 935, and define a new complex shape without triangle 930a. This process of identifying the furthest point, defining an intermediate triangle to isolate the furthest point from the center, and defining a new complex shape, may be repeated until complex shape 925 is defined by a plurality of intermediate triangles, like exemplary intermediate triangles 930a-d. This process may be implemented in a manner substantially similar to "ear cutting" tessellation methods that are known to the art.

Exemplary complex shape 935 also defines the boundaries of intermediate convex quadrilaterals 940a-f. Further to step 235, microprocessor 115 executes the software to store intermediate triangles 930a-d, along with intermediate convex quadrilaterals 940a-f, in memory 120.

Figure 10:
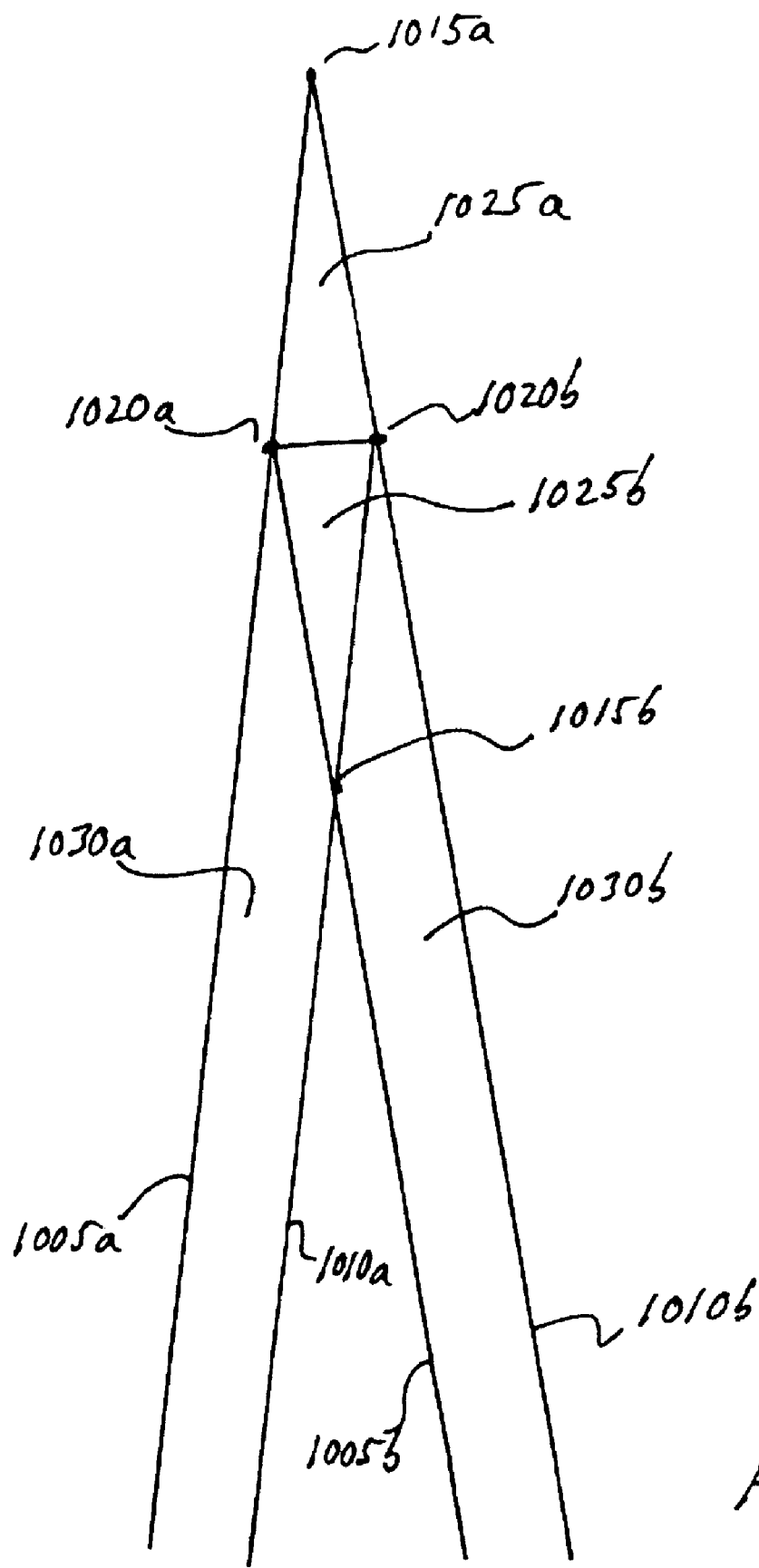
FIG. 10 illustrates an exemplary intersection of edges at an acute angle.

FIG. 10 illustrates another exemplary special case in which intermediate triangles are generated. In this case, exemplary parallel lines 1005a, 1010a, 1005b, and 1010b converge at an angle that causes intersection point 1015a to be an excessive distance from corresponding intersection point 1015b. The distance that constitutes excessive may be a parameter of the software that is stored in memory 120. If the distance between intersection point 1015a is an excessive distance from intersection point 1015b, microprocessor 115 may execute the software to define two new points 1020a and 1020b. Points 1020a and 1020b may be respectively located along parallel lines 1005a and 1010b, at a distance between intersection points 1015a and 1015b, whereby the distance may be a parameter of the software stored in memory 120.

With intersection points 1020a and 1020b defined, microprocessor 115 may execute the software to define intermediate triangles 1025a and 1025b, and intermediate convex quadrilaterals 1030a and 1030b.

If, in the course of defining parallel lines and intersection points at step 225, it is possible that a resulting redefined triangle (from step 230) may be impractically narrow, i.e., its width is less that one pixel. In this case, the software may include instructions for redefining an intersection point that will result in the redefined triangle having more favorable geometry. One result of this is that there may be a resulting overlap between triangles in the resulting collection of triangles (discussed with regard to step 245 below). However, the occurrence of such overlapping triangles, and the resulting anomalies in the resulting image, are sufficiently infrequent and relatively undetectable so that such a compromise is possible.

The exemplary processes for defining intermediate convex quadrilaterals and intermediate triangles, as described above, may be repeated for all edge intersections, as illustrated in FIG. 5, and stored in Table 3.

At step 240, microprocessor 115 executes the software to define new triangles within the intermediate convex quadrilaterals defined and stored in memory 120 at step 235.

Figure 11:
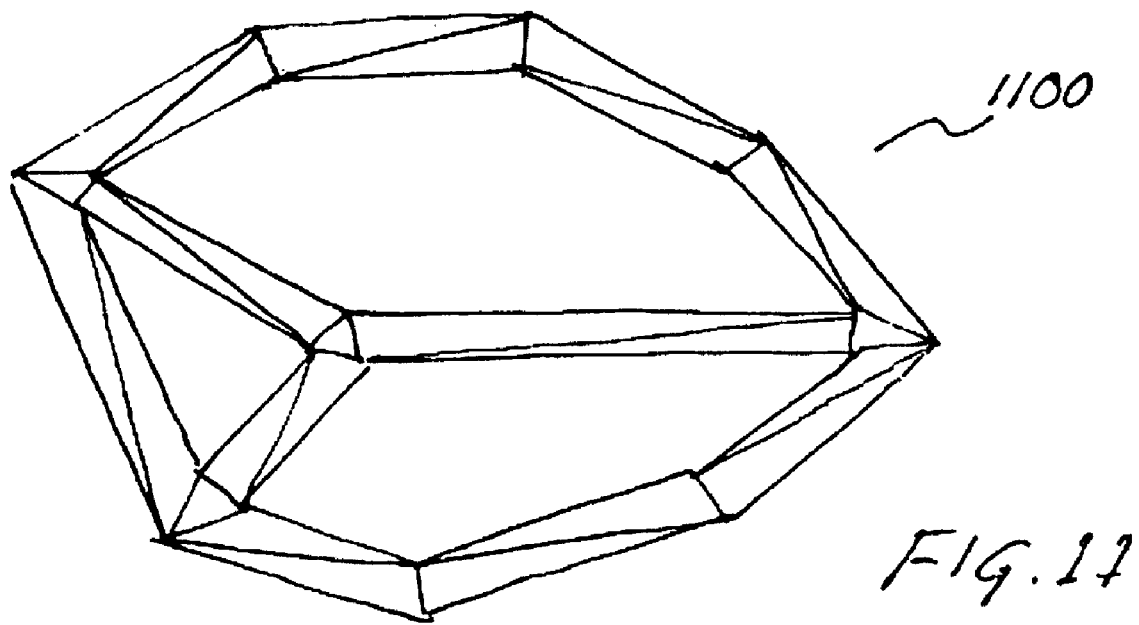
FIG. 11 illustrates a plurality of triangles corresponding to the edges of the connectivity graph of FIG. 5.

FIG. 11 illustrates an exemplary plurality of triangles 1100 corresponding to the plurality of edges 505-550 defined in step 220 and illustrated in FIG. 5, resulting from steps 215-240.

At step 245, microprocessor 115 executes the software to assemble and store triangles 1100 and redefined triangles 405a', 405b', 405c', 410a', 410b', 410c', and 415', along with any other triangles redefined according to step 230, and triangles tessellated at step 210 that were not subject to being redefined, in memory 120. This set of triangles may completely define an image corresponding to the image of the compound shape data received from CPU at step 205.

In the resulting plurality of triangles, the redefined triangles (e.g., 405a', 405b', 405c', 410a', 410b', 410c', and 415') are each of a single style. Each of these redefined triangles have vertices that are assigned the same style. However, plurality of triangles 1100, which correspond to edges 505-550, may be such that each has vertices assigned a different style. The changes in style within plurality of triangles 1100 correspond to the changes in style of the redefined triangles whose edges are "covered" by plurality of triangles 1100. Accordingly, the style within the intermediate triangles and new triangles may be interpolated so that the style within the given triangle blends from one vertex to the other. This way, plurality of edges 550 are blended, and aliasing of the edges is substantially mitigated.

Style interpolation within a given triangle is done by techniques that are known to the art and implemented in video driver hardware, such as video driver 110. Such interpolation techniques may include Gouraud shading, although other interpolation techniques may be used.

At step 250, microprocessor 115 rasterizes the image corresponding to the triangle data assembled at step 245, and provides the rasterized image data to display 125. In doing so, microprocessor 115 may use techniques that are known to the art to convert tessellated images into rasterized images.

At step 255, display 125 displays the rasterized image created at step 250.

Figure 12:
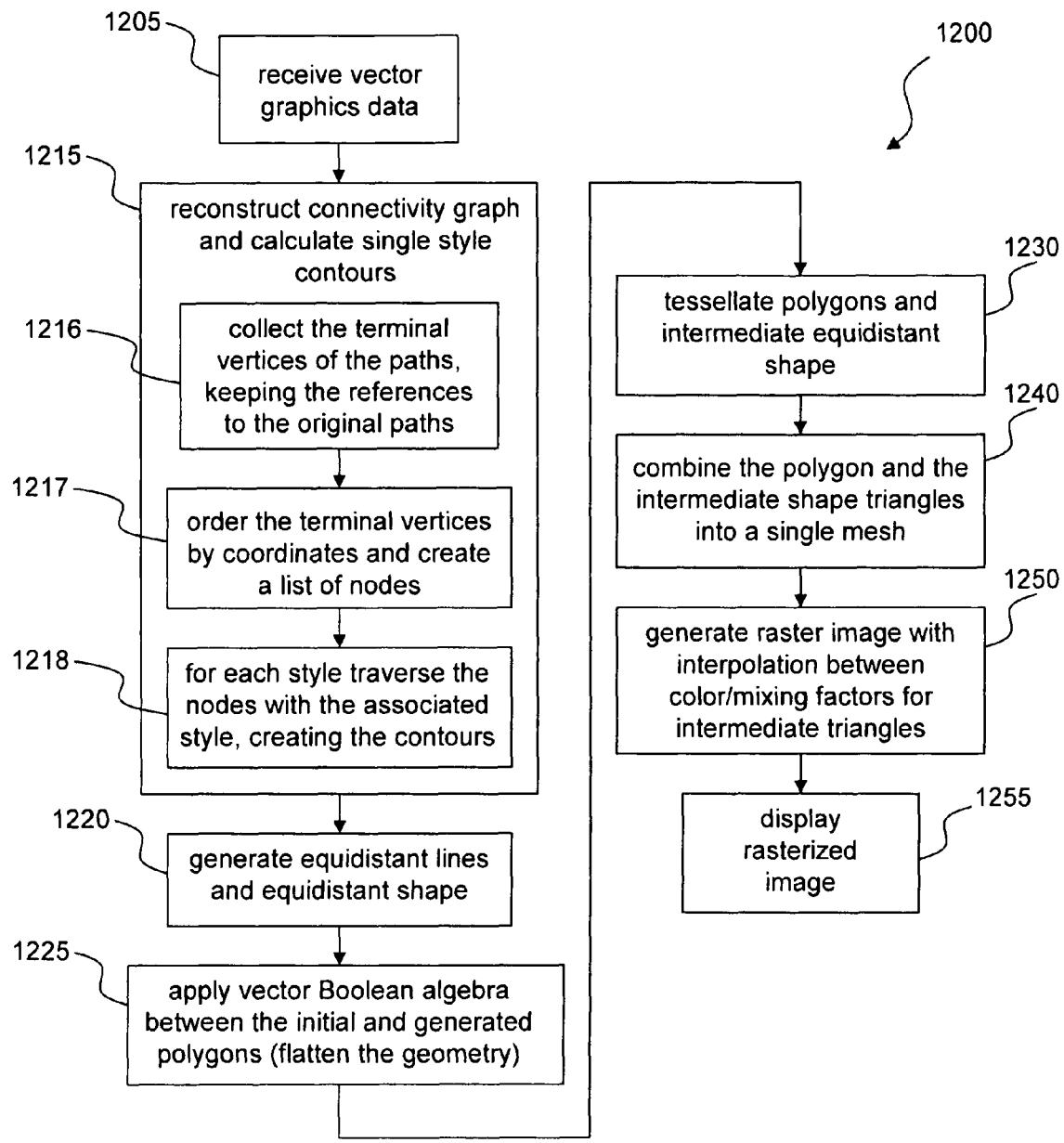
FIG. 12 illustrates another exemplary process for edge anti-aliasing vector graphics.

FIG. 12 illustrates another exemplary process 1200 for edge anti-aliasing vector graphics. Process 1200 may be implemented using system 100. As with process 200, process 1200 may be performed, all or in part, by microprocessor 115 executing the software stored in memory 120.

At step 1205, video driver 110 receives compound shape image data from CPU 105, in a manner that may be substantially similar to step 205 discussed above, including the possible variations discussed. On receiving the compound shape image data, microprocessor 115 may execute the software to store the compound shape data in memory 120. As with process 200 above, video driver 110 may receive vector graphics data in any known format and convert the vector graphics data into compound shape image data, and then store the compound shape image data in memory 120.

At step 1215, microprocessor 115 executes the software to construct a connectivity graph and calculate single style contours. In constructing the connectivity graph, microprocessor 115 executes the software to sort through all of the coordinates corresponding to terminal vertices of the paths received at step 1210.

Further to step 1215, microprocessor 115 executes the software to calculate a plurality of single style contours. A single style contour represents a cyclic list or paths (e.g., a loop) that substantially inscribes a region defined by vertices and edges.

Figure 13A:
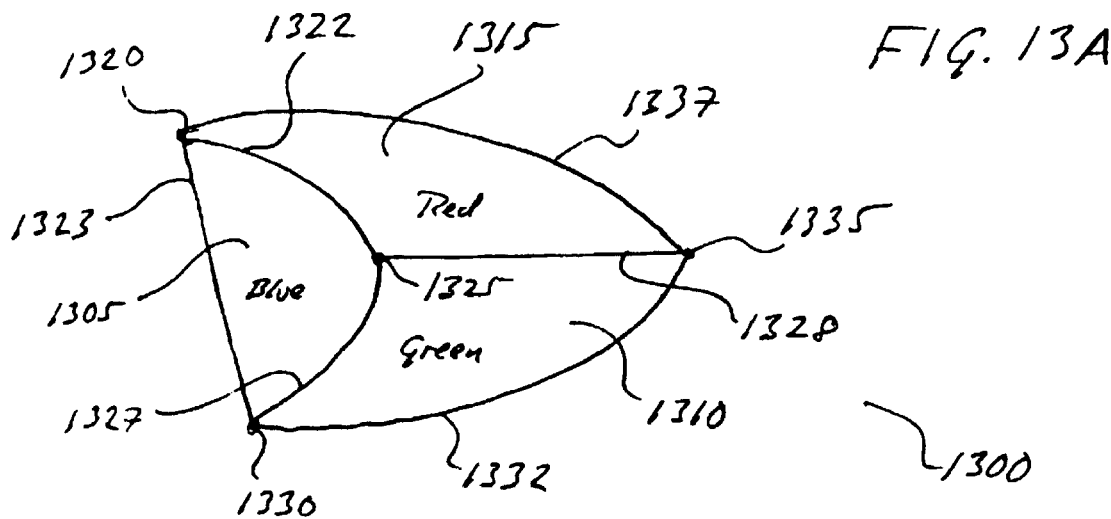
FIG. 13A illustrates an exemplary connectivity graph according to the process of FIG. 12.

FIG. 13A illustrates an exemplary connectivity graph 1300 for process 1200. Exemplary connectivity graph 1300 is a sample image that is used for illustration purposes. Exemplary connectivity graph 1300 may include a blue region 1305, a green region 1310, and a red region 1315, against a black background. Blue region 1305 may have vertices 1320, 1325, and 1330; and edges 1322, 1323, and 1327. Green region 1310 may have vertices 1330, 1335, and 1325; and edges 1332, 1328, and 1327. Red region 1315 may have vertices 1325, 1335, and 1320; and edges 1322, 1328, and 1337.

At step 1216, microprocessor 115 executes the software to sort through the compound shape image data and retrieve all of the terminal vertices of paths 1322, 1323, 1327, 1328, 1332, and 1337, and store the terminal vertices in memory 120. Each terminal vertex is retrieved twice, once corresponding to the left side style corresponding to the path, and once corresponding to the right side style corresponding to the path (see Table 1 for an exemplary compound path data format).

At step 1217, microprocessor 115 executes the software to order the terminal vertices identified at step 1216 by their coordinates. Groups of vertices with the same coordinates may form a node.

At step 1218, microprocessor 115 executes the software to traverse through the nodes, select the vertex in the node that has a given style, and designate the vertex as "visited." Microprocessor 115 then executes the software to identify the node having the opposite terminal vertex of the corresponding path, and identify the terminal vertex corresponding to the given style. This repeats until closure of a contour is detected, or when all terminal vertices having the given style are visited. Step 1218 is repeated for each style within the compound shape image data.

Figure 13B:
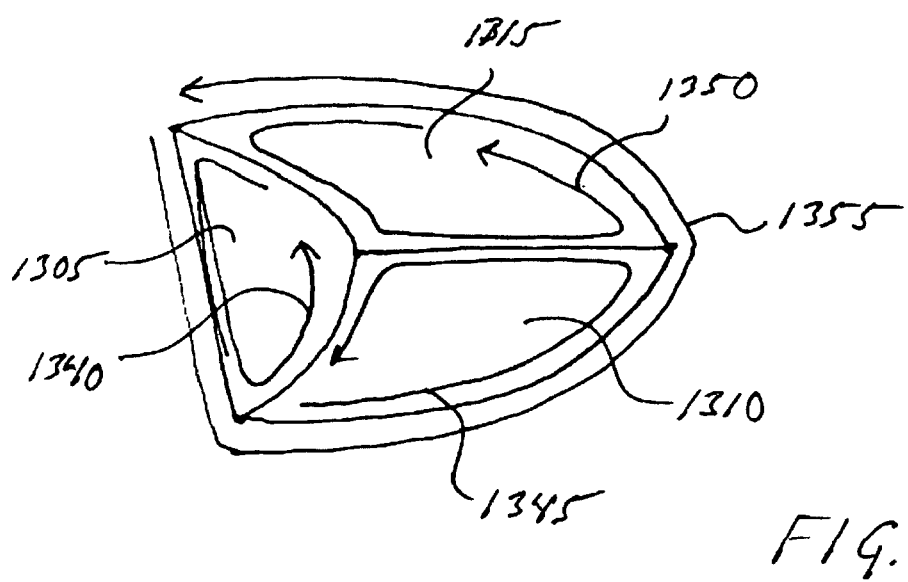
FIG. 13B illustrates an exemplary plurality of single style contours associated with the process of FIG. 12.

FIG. 13B illustrates exemplary connectivity graph 1300 with three single style contours. Single style contour 1340 substantially inscribes blue region 1305; single style contour 1345 substantially inscribes green region 1310; and single style contour 1350 substantially inscribes red region 1315. Single style contours 1340, 1345, and 1350 may all have the same direction. In calculating the single style contours, microprocessor 115 may execute the software to identify all of the vertices and edges that encompass a region unbroken by an edge, and store the vertices and edges in memory 120.

Further to step 1215, microprocessor 115 calculates an outermost loop 1355, which encompasses all of the vertices and edges of connectivity graph 1300, and stores the vertices and edges corresponding to outermost loop 1355.

At step 1220, microprocessor 115 executes instructions to generate equidistant lines corresponding to the single style contours created at step 1215. Equidistant lines may be line segments within single style contours whereby an equidistant line may lie between two vertices. There may be two equidistant lines for each edge, one on either side, and each corresponding to a different region.

Figure 13C:
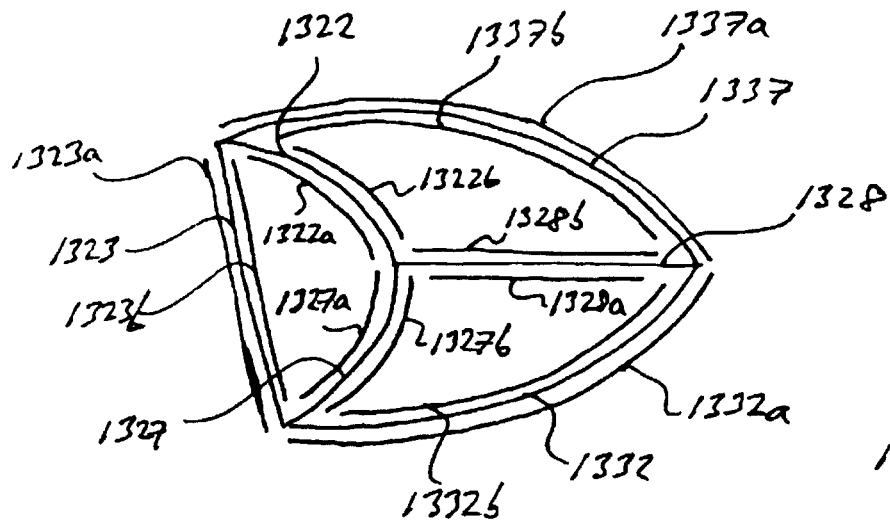
FIG. 13C illustrates an exemplary plurality of equidistant lines associated with the process of FIG. 12.

FIG. 13C illustrates an exemplary plurality of equidistant lines. Edge 1323 may have two corresponding equidistant lines: line 1323a, which corresponds to the black background and outermost loop 1355, and line 1323b, which corresponds to blue region 1305 and single style contour 1340. Edge 1327 may have two corresponding equidistant lines: line 1327a, which corresponds to blue region 1305 and single style contour 1340, and line 1327b, which corresponds to green region 1310 and single style contour 1345. Edge 1332 may have two corresponding equidistant lines: line 1332a, which corresponds to the black background and outermost loop 1355, and line 1332b, which corresponds to green region 1310 and single style contour 1345. Edge 1328 may have two corresponding equidistant lines: line 1328a, which corresponds to green region 1310 and single style contour 1345, and line 1328b, which corresponds to red region 1315 and single style contour 1350. Edge 1322 may have two corresponding equidistant lines: line 1322a, which corresponds to blue region 1305 and single style contour 1340, and line 1322b, which corresponds to red region 1315 and single style contour 1350. Edge 1337 may have two corresponding equidistant lines: line 1337a, which corresponds to the black background and outermost loop 1355, and line 1337b, which corresponds to red region 1315 and single style contour 1350.

Further to step 1220, microprocessor 115 executes the software to create an equidistant shape, which corresponds to the equidistant lines described above.

Figure 14A:
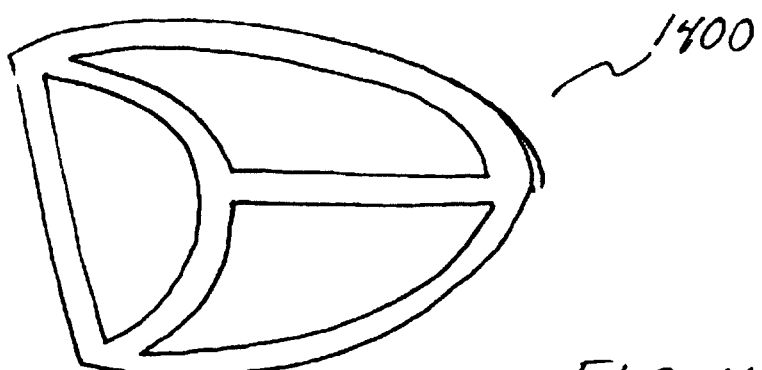
FIG. 14A illustrates an exemplary equidistant shape associated with the process of FIG. 12.
Figure 14B:
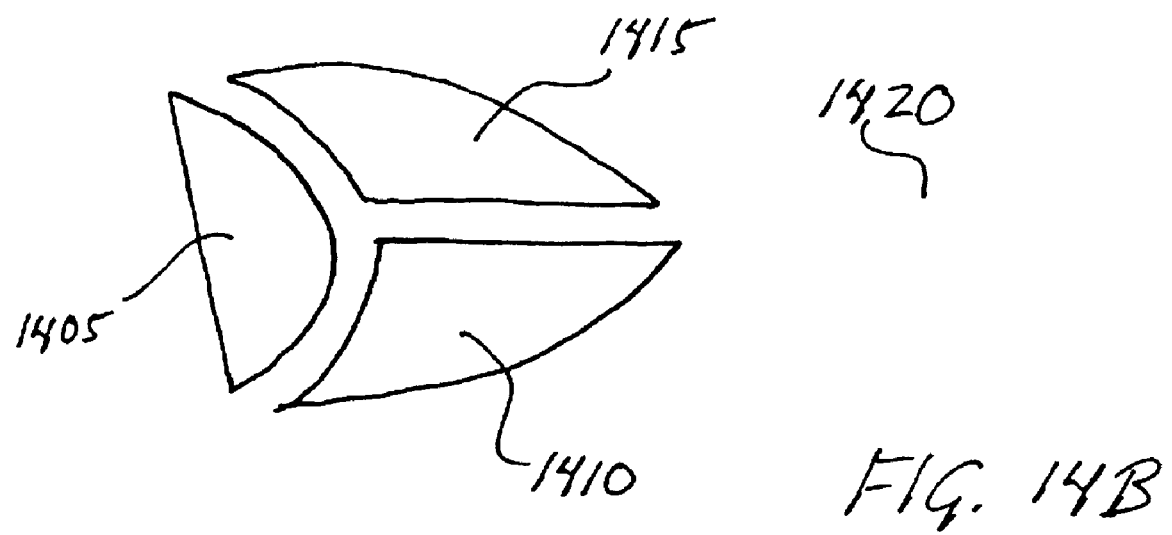
FIG. 14B illustrates an exemplary plurality of shrunk polygons associated with the process of FIG. 12.

FIG. 14A illustrates an exemplary equidistant shape 1400, wherein the boundaries of equidistant shape 1400 correspond to the equidistant lines.

At step 1225, microprocessor 115 executes the software to apply vector Boolean algebra between connectivity graph 1300 and equidistant shape 1400. In doing so, equidistant shape 1400 may be "subtracted" from connectivity graph 1300. This may result in a plurality of "shrunk" polygons, whereby polygon 1405 corresponds to blue region 1305; polygon 1410 corresponds to green region 1310; and polygon 1415 corresponds to red region 1315. Also included is background region 1420, which corresponds to the black background.

The effect of step 1225 may be referred to as "flattening" the geometry of connectivity graph 1300 and equidistant shape 1400 into a single plurality of polygons.

At step 1230, microprocessor 115 executes the software to tessellate the shrunk polygons and equidistant shape 1400. This results in a new triangle mesh, which is stored in memory 120.

At step 1240, microprocessor 115 executes the software to combine the triangles corresponding to the shrunk polygons and equidistant shape 1400 into a single triangle mesh.

Microprocessor 115 executes the software to interpolate styles using techniques that are known to the art, such as Gouraud shading. In doing so, microprocessor 115 executes the software to interpolate the styles for the triangles corresponding to equidistant shape 1400. As described above, intermediate shape 1400 corresponds to connectivity graph 1300, which in turn corresponds to edges between styles. Accordingly, style interpolation for the triangles corresponding to equidistant shape 1400 may be required.

The triangles corresponding to shrunk polygons 1405-1415 and background 1420 all have the same corresponding style, respectively. Accordingly, no style interpolation is done for the triangles corresponding to shrunk polygons 1405-1415 and background 1420.

At step 1250, microprocessor 115 executes the software to rasterize the new triangle mesh tessellated at step 1230 and interpolated at step 1240 using techniques that are known to the art.

At step 1255, video driver transmits the rasterized image to display 125, which may display the rasterized image.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer-implemented method of anti-aliasing vector graphics performed by a microprocessor executing software encoded in a memory of a video driver, comprising:
   receiving a first plurality of triangles corresponding to a tessellated image in the video driver;
   identifying a plurality of edges corresponding to the tessellated image, wherein each of the plurality of edges define a boundary between two adjacent styles;
   defining a plurality of intermediate quadrilaterals, wherein the plurality of intermediate quadrilaterals correspond to the plurality of edges;
   defining a second plurality of triangles, wherein each of the second plurality of triangles share an edge with an intermediate quadrilateral; and
   tessellating the intermediate quadrilaterals.

2. The computer-implemented method of claim 1, further comprising rasterizing the second plurality of triangles and the tessellated intermediate quadrilaterals.

3. The computer-implemented method of claim 1, wherein defining the plurality of intermediate quadrilaterals comprises:
   defining a plurality of parallel lines, wherein each of the plurality of edges has a parallel line on either side; and
   defining a plurality of intersection points, wherein the intersection points are located at intersections of the plurality of parallel lines.

4. The computer-implemented method of claim 3, wherein defining a plurality of intermediate quadrilaterals further comprises defining a plurality of intermediate triangles corresponding to intersections of at least three edges.

5. The computer-implemented method of claim 3, wherein defining the second plurality of triangles comprises:
   identifying the second plurality of triangles from within the first plurality of triangles, wherein each of the second plurality of triangles has a side adjacent to an edge; and
   translating a vertex of the of each of the second plurality of triangles to a corresponding intersection point.

6. The computer-implemented method of claim 1, wherein receiving the first plurality of triangles corresponding to a tessellated image comprises:
   receiving compound shape image data; and
   tessellating the compound shape image data.

7. The computer-implemented method of claim 1, wherein identifying the plurality of edges corresponding to the tessellated image comprises:
   identifying a first plurality of vertices corresponding a first subset of triangles, wherein the first plurality of vertices have a first coordinate, and wherein two of the first subset of triangles have a different style;
   identifying a second plurality of vertices corresponding to the two of the first subset of triangles having the different style, wherein the second plurality of vertices have a second coordinate; and
   defining the edge corresponding to the first coordinate and the second coordinate.

8. A computer-implemented method of anti-aliasing vector graphics performed by a microprocessor executing software encoded in a memory of a video driver, comprising:
   receiving compound shape vector graphics data in the video driver;
   constructing a connectivity graph corresponding to the compound shape vector graphics data;
   calculating a plurality of single style contours corresponding to the connectivity graph;
   calculating a plurality of equidistant lines corresponding to the plurality of single style contours;
   calculating an equidistant shape corresponding to the equidistant lines;
   subtracting the equidistant shape from the tessellated image to define a plurality of polygons; and
   tessellating the plurality of polygons and the equidistant shape.

9. The computer-implemented method of claim 8, further comprising rasterizing the tessellated polygons and equidistant shape to create a rasterized image.

10. The computer-implemented method of claim 9, further comprising displaying the rasterized image.

11. The computer-implemented method of claim 8, wherein constructing a connectivity graph comprises:
    identifying a plurality of terminal vertices, wherein each of the terminal vertices has a coordinate and a style; and
    ordering the terminal vertices according to its coordinate to form a plurality of nodes.

12. The computer-implemented method of claim 11, wherein calculating a plurality of single style contours comprises:
    identifying a terminal vertex within a node having a given style; and
    identifying an opposite terminal vertex corresponding to the given style.

13. A system for displaying images from digital data, comprising:
- a CPU;
- a display; and
- a video driver coupled to the CPU and the display, the video driver having a microprocessor and a memory, wherein the memory is encoded with instructions for receiving a first plurality of triangles corresponding to a tessellated image; identifying a plurality of edges corresponding to the tessellated image; defining a plurality of intermediate quadrilaterals, wherein the plurality of intermediate quadrilaterals correspond to the plurality of edges; defining a second plurality of triangles, wherein each of the second plurality of triangles share an edge with an intermediate quadrilateral; tessellating the intermediate quadrilaterals; rasterizing the second plurality of triangles and the tessellated intermediate quadrilaterals to create a rasterized image; and transmitting the rasterized image to the display.

14. The system of claim 13, wherein the instructions for defining the plurality of intermediate quadrilaterals comprises instructions for performing the steps of:
- defining a plurality of parallel lines, wherein each of the plurality of edges has a parallel line on either side; and
- defining a plurality of intersection points, wherein the intersection points are located at intersections of the plurality of parallel lines.

15. The system of claim 14, wherein the instructions for defining a plurality of intermediate quadrilaterals further comprises instructions for defining a plurality of intermediate triangles corresponding to intersections of at least three edges.

16. The system of claim 14, wherein the instructions for defining the second plurality of triangles comprises instructions for performing the steps of:
- identifying the second plurality of triangles from within the first plurality of triangles, wherein each of the second plurality of triangles has a side adjacent to an edge; and
- translating a vertex of the of each of the second plurality of triangles to a corresponding intersection point.

17. The system of claim 13, wherein the instructions for identifying the plurality of edges corresponding to the tessellated image comprises instructions for performing the steps of:
- identifying a first plurality of vertices corresponding a first subset of triangles, wherein the first plurality of vertices have a first coordinate, and wherein two of the first subset of triangles have a different style;
- identifying a second plurality of vertices corresponding to the two of the first subset of triangles having the different style, wherein the second plurality of vertices have a second coordinate; and
- defining the edge corresponding to the first coordinate and the second coordinate.

18. A computer readable medium encoded with instructions for a program configured for execution by a microprocessor to perform a method for anti aliasing vector graphics for a display, the program comprising:
- receiving compound shape vector graphics data;
- constructing a connectivity graph corresponding to the compound shape vector graphics data;
- calculating a plurality of single style contours corresponding to the connectivity graph;
- calculating a plurality of equidistant lines corresponding to the plurality of single style contours;
- calculating an equidistant shape corresponding to the equidistant lines;
- subtracting the equidistant shape from the tessellated image to define a plurality of polygons; and
- tessellating the plurality of polygons and the equidistant shape.

19. The computer readable medium of claim 18, further encoded with instructions for rasterizing the tessellated polygons and equidistant shape to create a rasterized image.

20. The computer readable medium of claim 18, wherein the instructions for constructing a connectivity graph comprises:
- identifying a plurality of terminal vertices, wherein each of the terminal vertices has a coordinate and a style; and
- ordering the terminal vertices according to its coordinate to form a plurality of nodes.

* * * * *